US012601547B2

(12) United States Patent
Sobanski et al.

(10) Patent No.: US 12,601,547 B2
(45) Date of Patent: Apr. 14, 2026

(54) EXTRUDED CONNECTED MICROTUBE AND HEAT EXCHANGER

(71) Applicant: Raytheon Technologies Corporation, Farmington, CT (US)

(72) Inventors: Jon Erik Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 105 days.

(21) Appl. No.: 18/314,891

(22) Filed: May 10, 2023

(65) Prior Publication Data

US 2024/0377141 A1     Nov. 14, 2024

(51) Int. Cl.
| | |
|---|---|
| *F28D 7/16* | (2006.01) |
| *B23P 15/26* | (2006.01) |
| *F28F 9/02* | (2006.01) |

(52) U.S. Cl.
CPC ................ *F28D 7/16* (2013.01); *B23P 15/26* (2013.01); *F28F 9/02* (2013.01)

(58) Field of Classification Search
CPC .. F28D 7/16; F28D 7/1615; F28F 9/02; F28F 7/02; F28F 1/16; F28F 1/22; F28F 2255/16; B23P 15/26
See application file for complete search history.

(56) References Cited

U.S. PATENT DOCUMENTS

| | | | | |
|---|---|---|---|---|
| 5,769,157 | A * | 6/1998 | Ikejima ................ | B23K 1/0012 |
| | | | | 165/184 |
| 6,918,435 | B2 * | 7/2005 | Dwyer .................. | F24F 1/0067 |
| | | | | 29/890.047 |
| 10,317,141 | B2 | 6/2019 | Vestergaard et al. | |
| 2014/0231056 | A1 | 8/2014 | Covington et al. | |
| 2018/0112925 | A1 * | 4/2018 | Zanardi ................ | F28F 9/0263 |
| 2018/0306516 | A1 | 10/2018 | Miller | |
| 2019/0360753 | A1 * | 11/2019 | Zhang .................. | F28D 1/0391 |
| 2021/0003350 | A1 | 1/2021 | Nakano et al. | |
| 2021/0010727 | A1 | 1/2021 | Andou et al. | |

FOREIGN PATENT DOCUMENTS

EP          4030131 A1     7/2022

OTHER PUBLICATIONS

Extended European Search Report for European Application No. 24175232.8 mailed Sep. 24, 2024.

* cited by examiner

*Primary Examiner* — Harry E Arant
(74) *Attorney, Agent, or Firm* — Carlson, Gaskey & Olds, P.C.

(57)          ABSTRACT

A heat exchanger assembly includes an inlet manifold that is configured to receive a working fluid, a plurality of microtube assemblies that define corresponding plurality passages for the working fluid and an outlet manifold that is configured to exhaust the working fluid. The plurality of microtube assemblies include a one-piece unitary structure that has a web portion that extends between at least a first microtube portion and a second microtube portion.

12 Claims, 8 Drawing Sheets

EXTRUDED CONNECTED MICROTUBE AND HEAT EXCHANGER

TECHNICAL FIELD

The present disclosure relates generally to a heat exchanger with features for managing vibration to mitigate harmonic response.

BACKGROUND

Microtube heat exchangers include many very small tubes through which a working fluid is pumped. Another working fluid is flowed across an external surface of the tubes to provide a transfer of thermal energy. In extreme applications, such as use in aircraft propulsion systems, a harmonic response induced by vibrations may impact the operational life of the heat exchanger.

SUMMARY

A heat exchanger assembly according to one example disclosed embodiment includes, among other possible things, an inlet manifold that is configured to receive a first working fluid, a plurality of microtube assemblies that define corresponding plurality passages for the first working fluid, each of the plurality of microtube assemblies include a one-piece unitary structure that has a web portion that extends between at least a first microtube portion and a second microtube portion, and an outlet manifold that is configured to exhaust the first working fluid.

In a further embodiment of the foregoing heat exchanger assembly, each of the plurality of microtube assemblies is formed by extruding the web portion, the first microtube portion and the second microtube portion without any formed seams or joints.

In a further embodiment of any of the foregoing heat exchanger assemblies, the web portion, the first microtube portion and the second microtube portion have a common longitudinal length.

In a further embodiment of any of the foregoing heat exchanger assemblies, the first microtube portion and the second microtube portion have a common longitudinal length and the web portion is of secondary length less than common longitudinal length.

In a further embodiment of any of the foregoing heat exchanger assemblies, web portion includes a plurality of web portions spaced apart along a common longitudinal length of the first microtube portion and the second microtube portion.

In a further embodiment of any of the foregoing heat exchanger assemblies, the first microtube portion has a first inner diameter and the second microtube portion has a second inner diameter that is the same as the first inner diameter.

In a further embodiment of any of the foregoing heat exchanger assemblies, the first microtube portion has a first outer diameter and the second microtube portion has a second outer diameter that is the same as the first outer diameter.

In a further embodiment of any of the foregoing heat exchanger assemblies, the first microtube portion has a first wall thickness and the second microtube portion has a second wall thickness that is the same as the first wall thickness.

In a further embodiment of any of the foregoing, the heat exchanger assembly further includes a third microtube portion and a second web portion.

In a further embodiment of any of the foregoing heat exchanger assemblies, the second web portion extends outward from one of the first microtube portion and the second microtube portion.

In a further embodiment of any of the foregoing heat exchanger assemblies, the third microtube portion includes a third inner diameter that is different than a first inner diameter of the first microtube portion and a second inner diameter of the second microtube portion.

In a further embodiment of any of the foregoing heat exchanger assemblies, the third microtube portion includes a third wall thickness that is greater than a wall thickness of either the first microtube portion and the second microtube portion.

In a further embodiment of any of the foregoing heat exchanger assemblies, the second web portion includes a second width transverse to a longitudinal length that is different than a first width of the first web portion.

In a further embodiment of any of the foregoing, the heat exchanger assembly further includes a fourth microtube portion, a third web portion that extends between the fourth microtube portion and one of the first microtube portion, the second microtube portion and the third microtube portion and a fourth web portion.

A heat exchanger assembly according to another example disclosed embodiment includes, among other possible things, an inlet manifold that is configured to receive a first working fluid, an outlet manifold that is spaced apart from the inlet manifold, and a plurality of microtube assemblies that define corresponding plurality passages for the first working fluid between the inlet manifold and the outlet manifold, each of the plurality of microtube assemblies include a one-piece unitary structure that has a web portion that extends between at least a first microtube portion and a second microtube portion, and the plurality of microtube assemblies are spaced apart from each other in a first direction transverse to the longitudinal length and a second direction transverse to the longitudinal length.

In a further embodiment of the foregoing heat exchanger assembly, the plurality of microtube assemblies are arranged in at least two rows aligned in one of the first direction and the second direction and offset in the other of the first direction and the second direction.

In a further embodiment of any of the foregoing heat exchanger assemblies, the plurality of microtube assemblies further includes a third microtube portion and a second web portion, the third microtube portion includes a third inner diameter that is different than a first inner diameter of the first microtube portion and a second inner diameter of the second microtube portion.

In a further embodiment of any of the foregoing heat exchanger assemblies, an orientation of the plurality of microtube assemblies is alternated between a first orientation of the third microtube portion and a second orientation of the third microtube portion.

In a further embodiment of any of the foregoing heat exchanger assemblies, the third inner diameter of the third microtube portion is smaller than either of the first inner diameter and the second inner diameter.

In a further embodiment of any of the foregoing heat exchanger assemblies, the third microtube portion includes a third wall thickness of the third wall thickness is greater than a wall thickness for either of the first microtube portion and the second microtube portion.

A method of assembling a heat exchanger according to another example disclosed embodiment includes, among other possible things, the steps of forming a plurality of microtube assemblies a one-piece unitary structure that has a web portion that extends between at least a first microtube portion and a second microtube portion that attaches a first end of each of the plurality of microtube assemblies to an inlet manifold, and attaching a second end of each of the plurality of microtube assembles to an outlet manifold.

In a further embodiment of the foregoing method, forming the plurality of microtube assemblies includes extruding the web portion, the first microtube portion and the second microtube portion without any formed seams or joints.

In a further embodiment of any of the foregoing, the method further includes arranging the plurality of microtube assemblies to be spaced apart from each other in both a first direction transverse to the longitudinal length and a second direction transverse to the longitudinal length.

In a further embodiment of any of the foregoing, the method further includes arranging the plurality of microtube assemblies in at least two rows aligned in one of the first direction and the second direction and offset in the other of the first direction and the second direction.

In a further embodiment of any of the foregoing, the method further includes forming the plurality of microtube assemblies further includes forming a third microtube portion and a second web portion.

In a further embodiment of any of the foregoing, the method further includes forming the third microtube portion to include a third inner diameter that is different than a first inner diameter of the first microtube portion and a second inner diameter of the second microtube portion.

In a further embodiment of any of the foregoing, the method further includes arranging the plurality of microtube assemblies to alternate between a first orientation of the third microtube portion and a second orientation of the third microtube portion.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
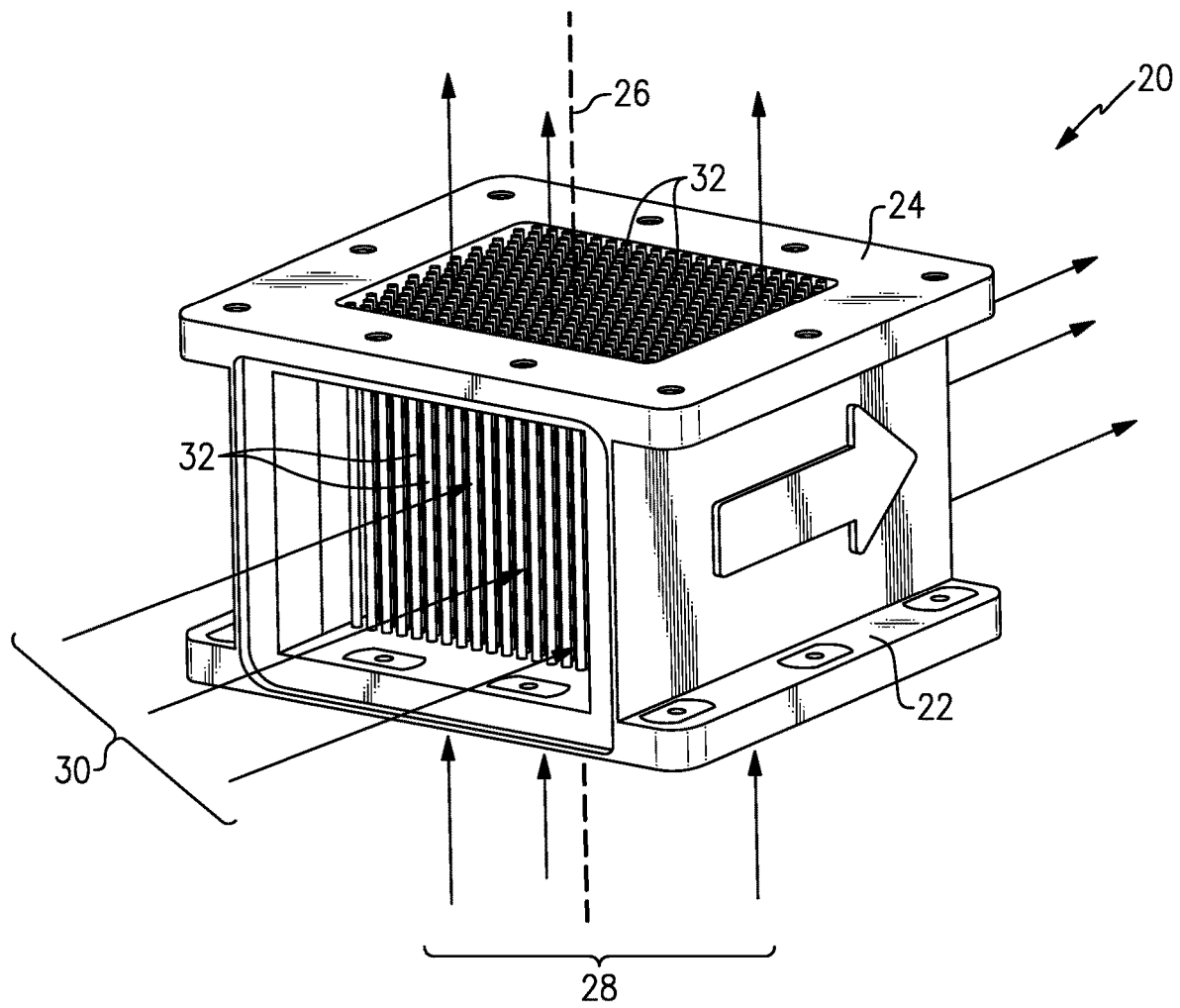
FIG. 1 is a schematic view of an example microtube heat exchanger assembly.

Referring to FIG. 1, an example heat exchanger assembly is schematically shown and generally indicated at 20. The heat exchanger assembly 20 includes a plurality of microtube assemblies 32 arranged between an inlet manifold 22 and an outlet manifold 24. Each of the microtube assemblies 32 are formed with tube and web portions as an integral one-piece part that provides increased stiffness and reduced vibratory excitement.

The microtube assemblies 32 are defined along a longitudinal exchanger axis 26 and define a plurality of passages 34 for a first flow 28. The microtube assemblies 32 are spaced apart from each other to define spacing for a second flow 30. The second flow 30 is arranged through the heat exchanger assembly 20 in a direction transverse to the longitudinal axis 26 and the first flow 28. The first flow 28 and the second flow 30 are in thermal communication to transfer thermal energy between the first and second flows 28, 30.

Figures 2, 3:
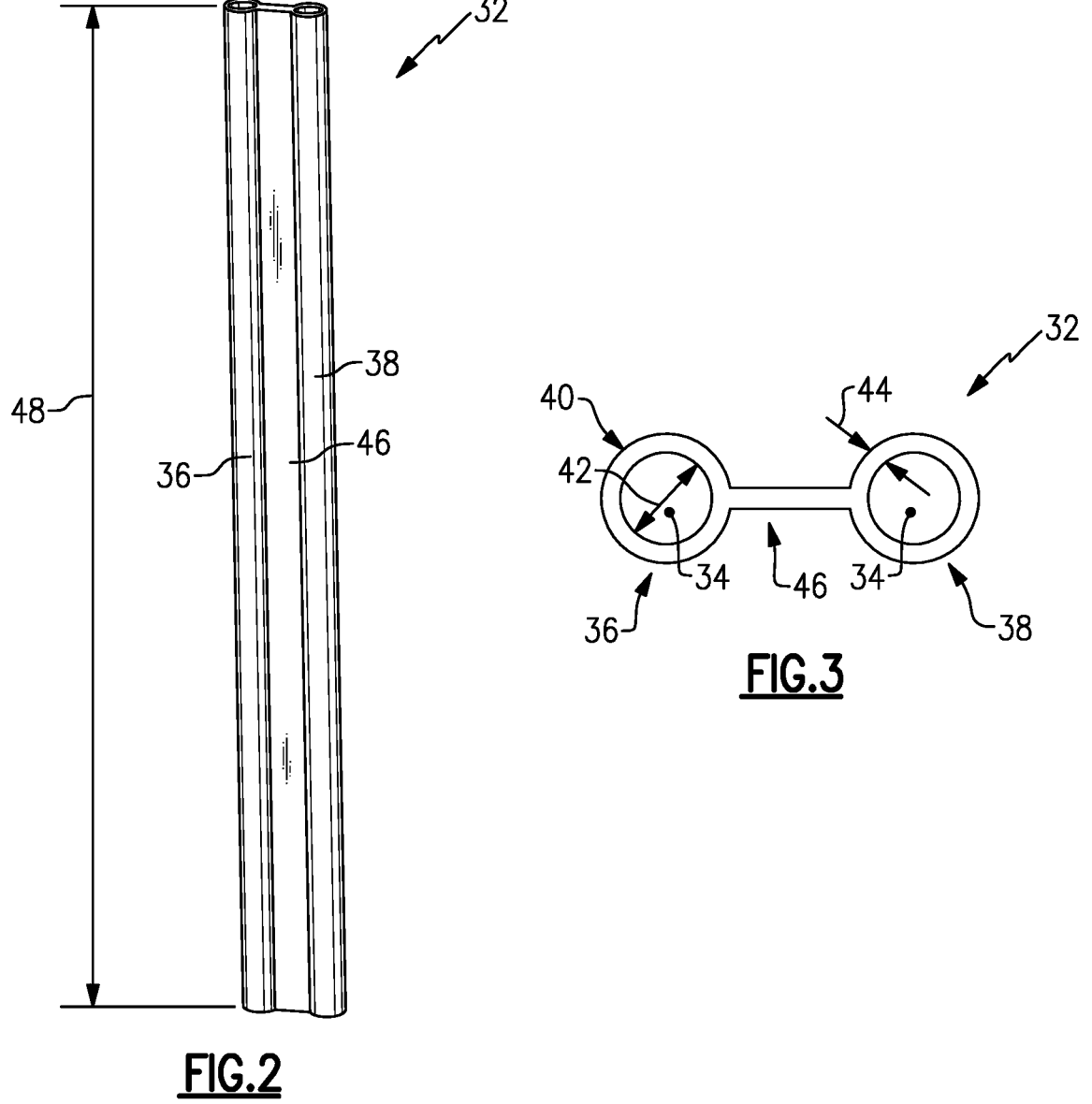
FIG. 2 is a perspective view of an example microtube assembly.
FIG. 3 is a cross-sectional view of the example microtube assembly shown in FIG. 2.

Referring to FIGS. 2 and 3 with continued reference to FIG. 1, each of the plurality of example microtube assemblies 32 include a first microtube portion 36 and a second microtube portion 38 joined by a web portion 46. The integral web portion 46 increase stiffness of the microtube assembly 32 and provides additional surface area for heat transfer.

The term microtube as utilized in this disclosure refers to tube portions that are very small, such as for example having an inner diameter equal to or less than about 5.0 mm (0.20 inch). The provided definition is for general purposes and other sizes may be utilized and are within the scope and contemplation of this disclosure.

The example tube portions 36 and 38 include the same shape and size. In this example, both tube portions 36, 38 includes equal outer diameters 40, inner diameters 44 and wall thick equal inner diameter 42 and wall thickness 44. A longitudinal length 48 of the microtube assembly 32 is the same for each of the tube portions 36, 38 and the web portion 46.

The example microtube assembly 32 is formed as a single unitary part with no seams between the various portions. Seams in structures that are exposed to high pressures and vibrations may create localized regions of high fatigue that can shorten operational life. The example microtube assembly 32 is formed utilizing an extruding process that provides the desired shape without the creation of any seams between the tube portions and the web portion 46. Moreover, the example microtube assembly 32 may be formed utilizing other processes that provide a seamless and jointless structure. For example, casting, die casting, injection molding and additive manufacturing processes may be utilized along with materials applicable to such processes that are suitable for an application specific environment.

Figure 4:
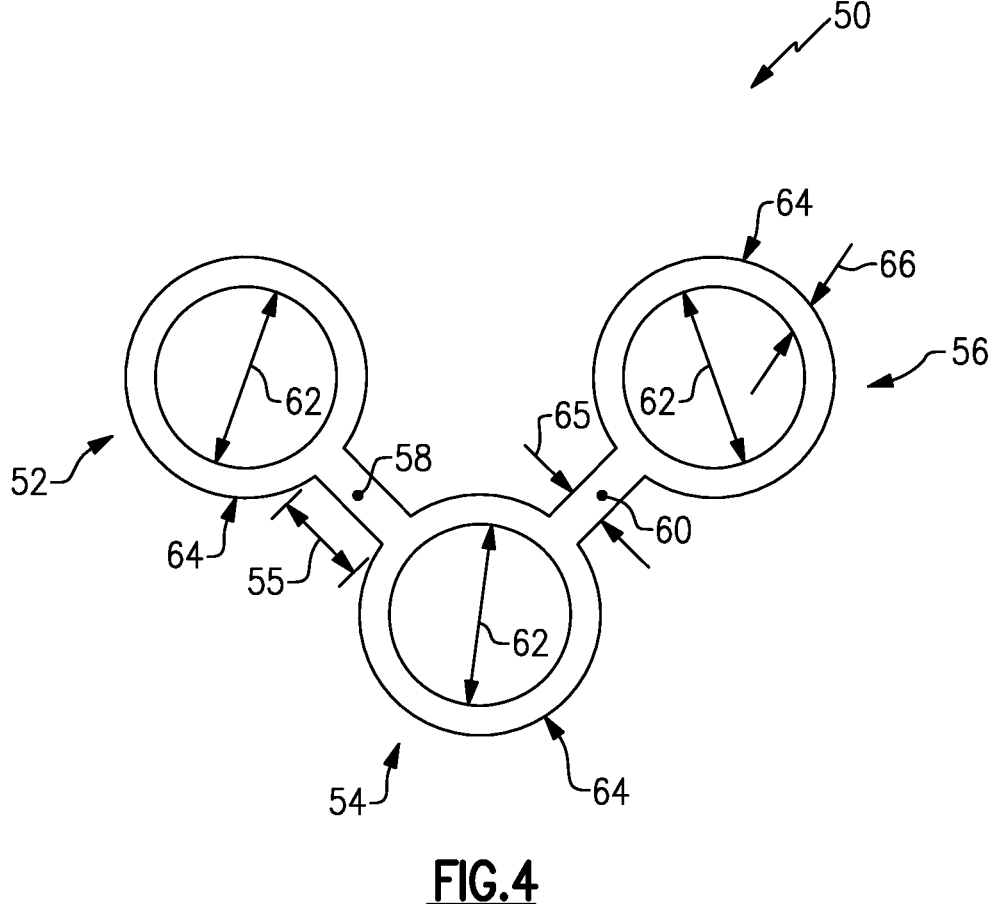
FIG. 4 is a cross-sectional view of another example microtube assembly.

Referring to FIG. 4, another example microtube assembly 50 is schematically shown and includes first, second and third tube portions 52, 54, 56. The tube portions 52, 54, 56 are separated by a first web portion 58 and a second web portion 60. In one disclosed example, each of the tube portions 52, 54 and 56 are identically sized. Each of the tube portions 52, 54 and 56 include the same inner diameter 62, outer diameter 64 and wall thickness 66. In the example embodiment shown in FIG. 4, the tube portions 52, 54 and 56 are generally arranged in a V-shape with the web portions 58, 60 extending from the second, centrally orientated tube portion 54. The web portions 58, 60 could be arranged at angles different than that shown to provide a desired orientation between the tube portions 52, 54 and 56. The example web portions 58, 60 are of the same length and thickness in the disclosed example microtube assembly 50.

Figure 5:
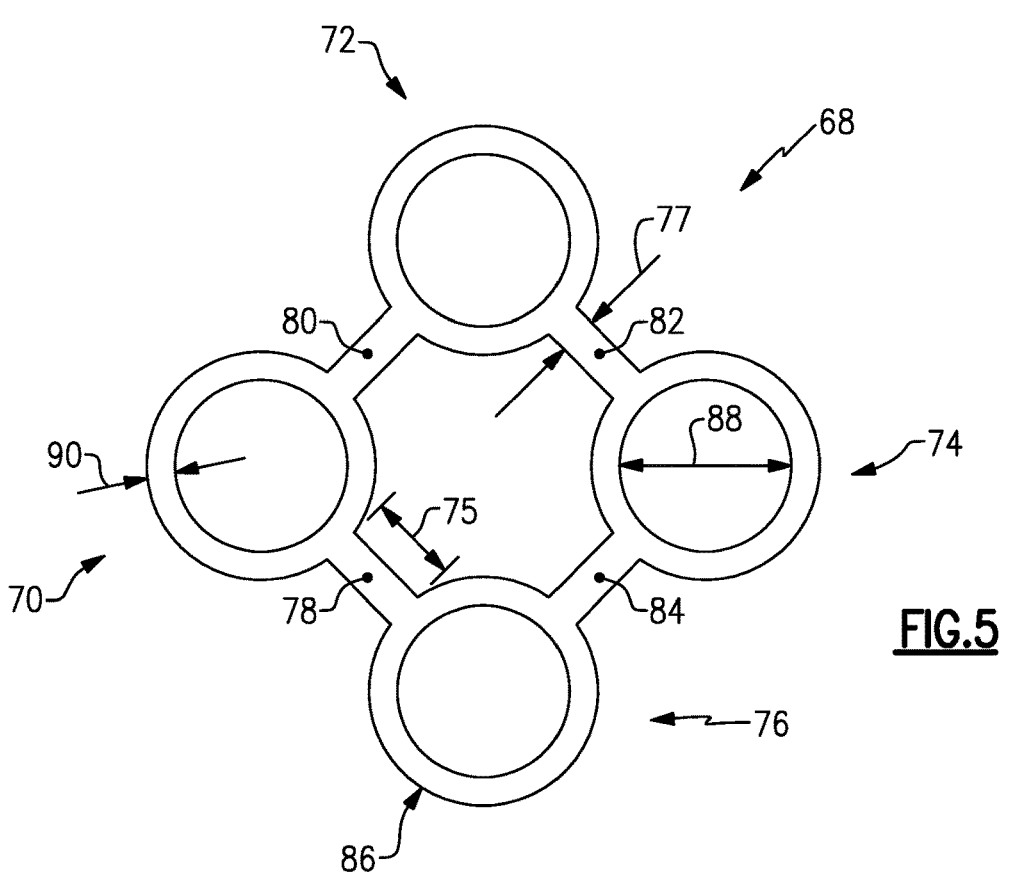
FIG. 5 is a cross-sectional view of another example microtube assembly.
Figure 6:
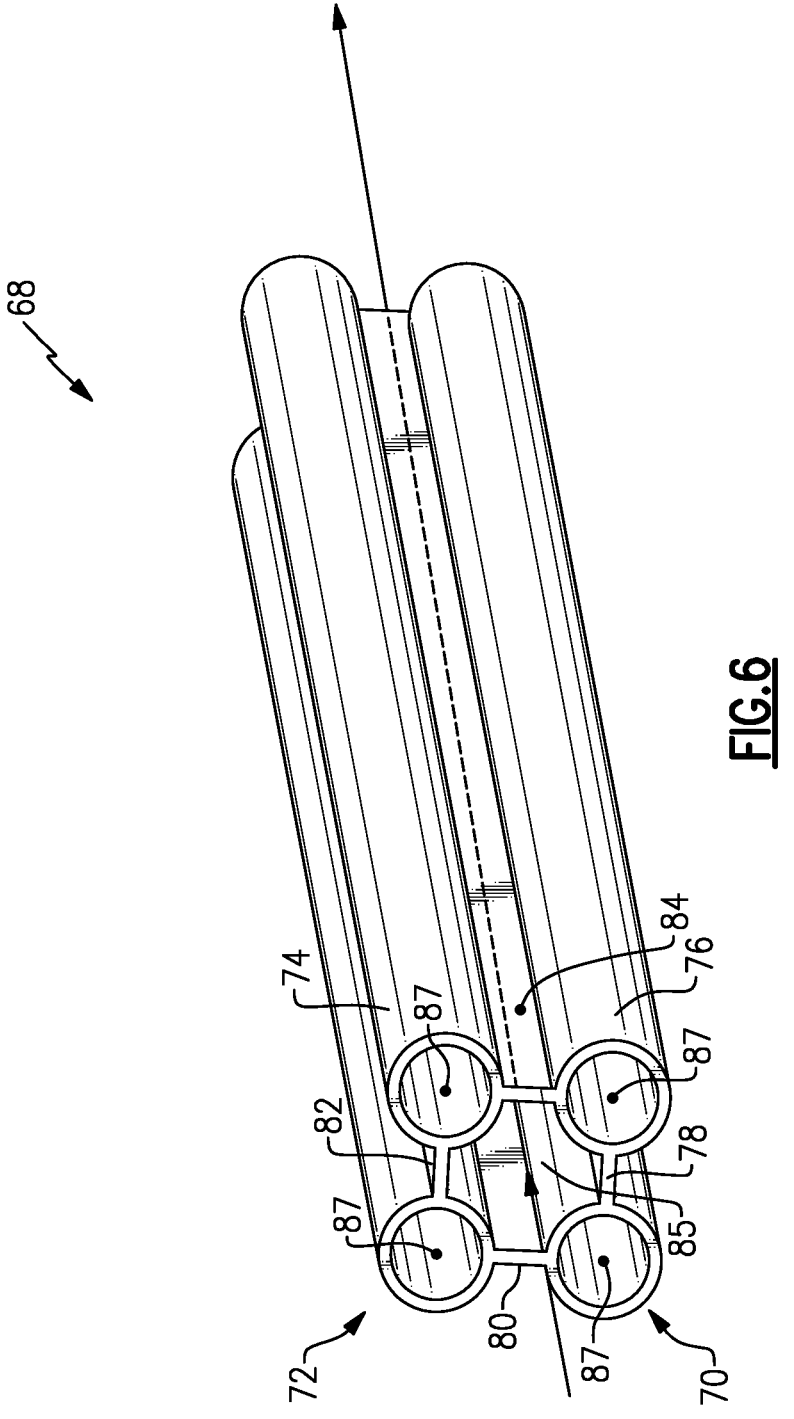
FIG. 6 is a perspective view of the example microtube assembly shown in FIG. 5.

Referring to FIGS. 5 and 6, another example microtube assembly 68 is schematically shown and includes first, second, third and fourth tube portions 70, 72, 74, and 76 arranged in a generally square shape. The tube portions 70, 72, 74, and 76 are attached to each other by first, second, third and fourth web portions 78, 80, 82, and 84. Each of the tube portions 70, 72, 74, and 76 are identical. Accordingly, each of the tube portions 70, 72, 74, and 76 include an equal outer diameter 86, inner diameter 88 and wall thickness 90. The web portions 78, 80, 82, and 84 have equal lengths 75 and wall thickness 77.

The shape of the microtube assembly 68 defines an interior passage 85 (FIG. 6) that extends the entire longitudinal length. The interior passage 85 is separate from the passages 87 defined through the inner diameter 88 of each of the tube portions 70, 72, 74, and 76. In one disclosed example, the interior passage 85 may provide a passage for a flow common with the flow through the passages 87 within the tube portions 70, 72, 74, and 76. In another example embodiment, the interior passage 85 may provide for passage of a flow that is different from that communicated through the passages 87 through the tube portions 70, 72, 74, and 76.

Although the example microtube assembly embodiments disclose tube portions with common features, each of the tube portions may be tailored to accommodate different flow characteristics.

Figure 7:
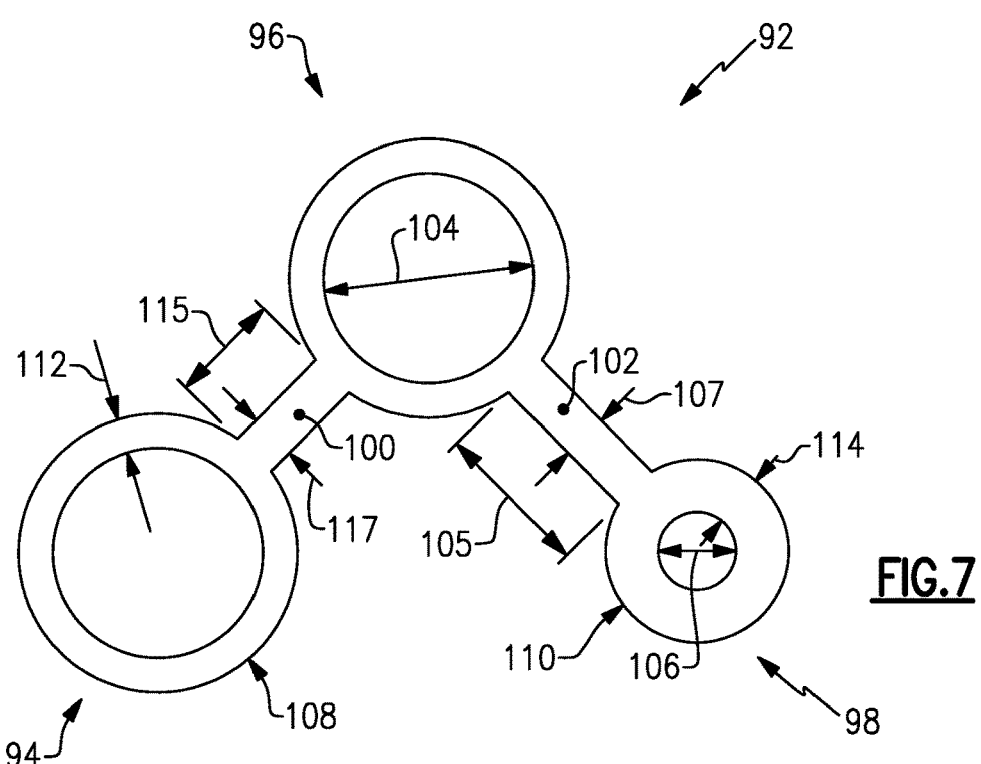
FIG. 7 is a cross-sectional view of another example microtube assembly.

Referring to FIG. 7, another example microtube assembly 92 is shown and includes first, second and third tube portions 94, 96 and 98. The third tube portion 98 is different from the first and second tube portions 94, 96. A first web portion 100 and a second web portion 102 are shown and connect the tube portions 94, 96 and 98.

In this disclosed example, the first and second tube portions 94 and 96 are identically formed to include the same outer diameter 108, inner diameter 104 and wall thickness 112. The third tube portion 98 includes an outer diameter 114 that is smaller than the outer diameter 108. An inner diameter 106 of the third tube portion 98 is smaller than the inner diameter 104 of the first and second tube portions 94, 96. The wall thickness 110 of the third tube portion 98 is greater than the wall thickness 112 of the first and second tube portions 94, 96.

The third tube portion 98 provides for passage of fluids at higher pressures due to the greater wall thickness 114. The greater wall thickness of the third tube portion 98 also increases stiffness of the entire microtube assembly 92 to reduce vibratory excitement in response to a vibrational input. Although the example microtube assembly 92 includes one tube portion with the increased thickness 114, more than one tube portion may have the increased wall thickness.

Figures 8, 9:
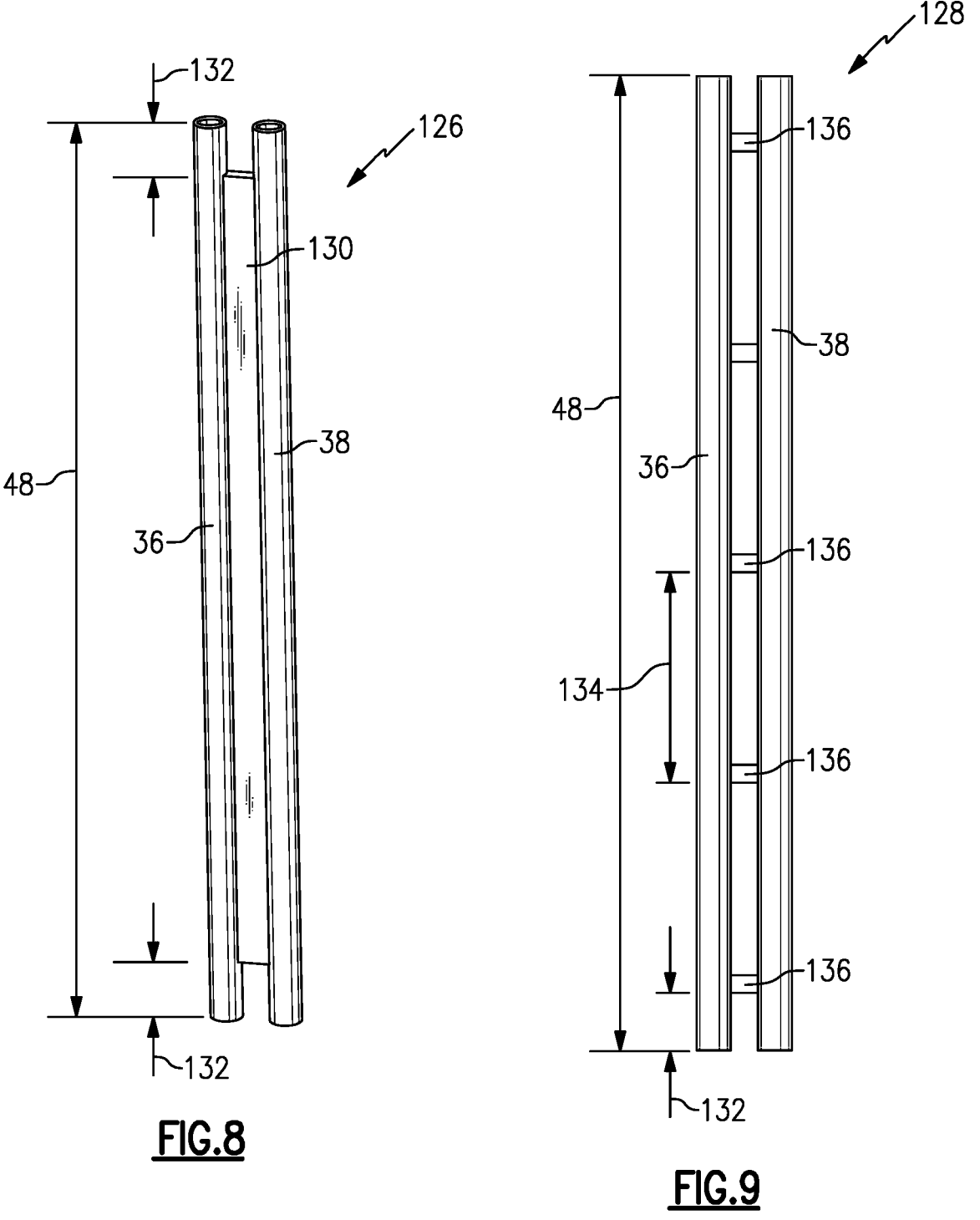
FIG. 8 is perspective view of another microtube assembly embodiment.
FIG. 9 is a perspective view of another microtube assembly embodiment.

Referring to FIG. 8, an example microtube assembly 126 is shown with first and second tube portions 36, 38 connected by a web portion 130. The example assembly 126 includes a longitudinal length 48. The tube portions 36, 38 extend the length 48 and the web portion 130 is less than the length 48. The web portion 130 is set back a distance 132 from each end to provide free ends of the tube portions 36, 38 to accommodate joining of the microtube assembly 126 into a heat exchanger assembly. The web portion 130 still provides significant stiffness with the length provided. The setback web portion 130 is shown by way of example with a microtube assembly having two tube portions. However, any of the example disclosed microtube assemblies could include the set back to provide for assembly into a heat exchanger.

Referring to FIG. 9, another microtube assembly 128 is shown and includes segmented web portions 136 that are spaced a distance 134 apart from each other. The assembly 128 includes the longitudinal length 48 of the tube portions 36, 38 separated by the web portions 136. The example web portions 136 are formed by secondary machining of an initially formed full length web portion. The segmented and spaced apart web portions 136 provide for a lighter assembly and provides additional flow spaces for cross-flows in an assembled heat exchanger assembly. Although the example microtube assembly 128 is disclosed by way of example with two tube portions, the segmented web could be provided for microtube assemblies with more than one web section connecting more than two tube portions and remain within the contemplation and scope of this disclosure.

Figure 10:
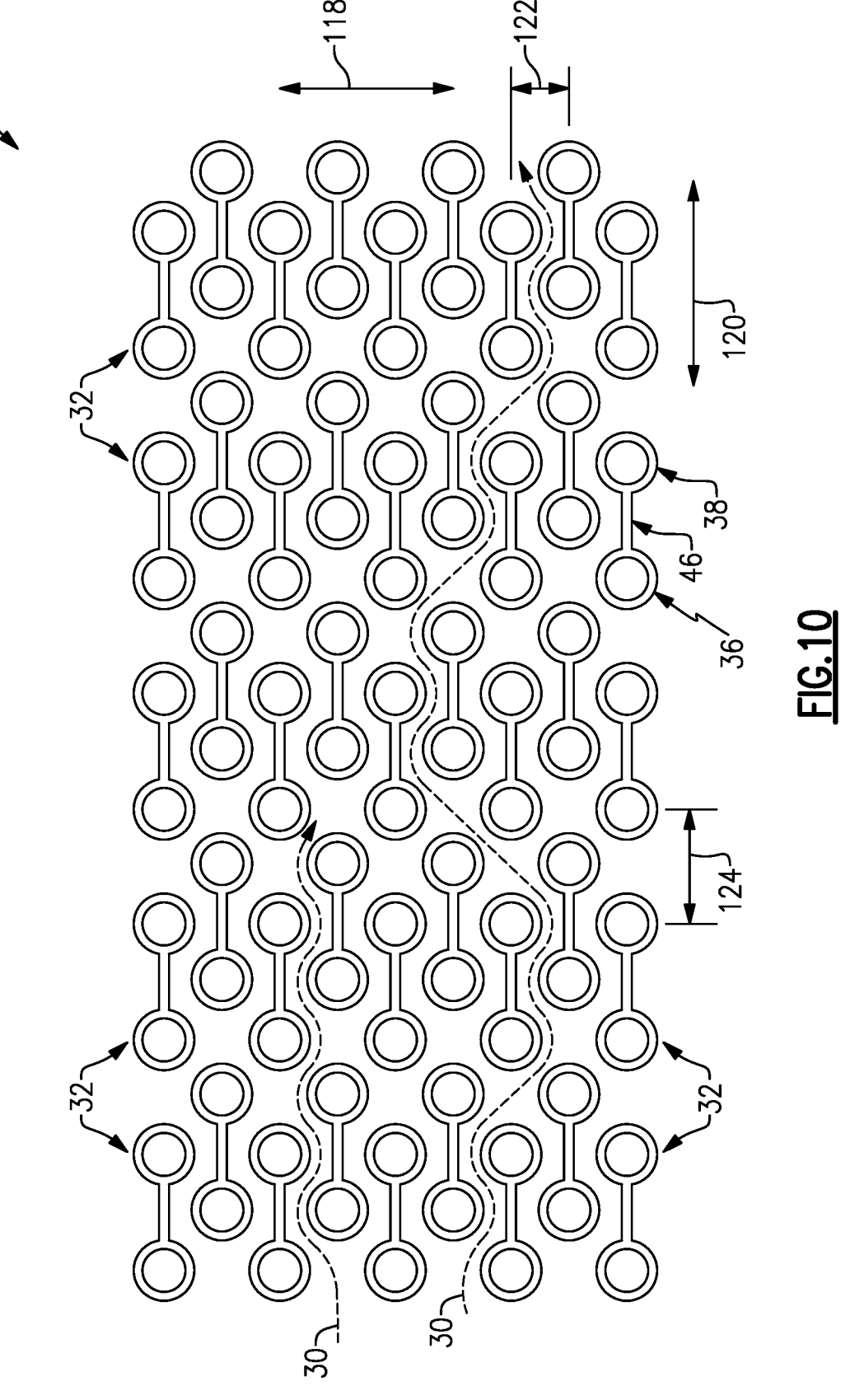
FIG. 10 is a schematic view of a portion of an example microtube array embodiment.

Referring to FIG. 10 with further reference to FIG. 1, a portion of an example microtube array 116 for the heat exchanger assembly 20 is shown in cross-section in a direction transverse to the longitudinal axis 26. The example microtube assemblies 32 are shown including first and second tube portions 36, 38 joined by the single web portion 46. The microtube assemblies 32 are arranged and aligned along a first axis 118 and a second axis 120. Although the example array 116 is shown and described as being formed utilizing the example microtube assemblies 32, other microtube assemblies, such as for example microtube assemblies 50 and 68 could also be utilized. Moreover, a combination of other the disclosed and described microtube assemblies 32, 50 and 68 could also be utilized and is within contemplation and scope of this disclosure.

The example array 116 aligns the microtube assemblies 32 in rows spaced apart a distance 122 along the first axis 118. The microtube assemblies 32 are further spaced apart a distance 124 and aligned along the second axis 120. As is shown in FIG. 10, the tube portions 36, 38 of each of the assemblies 32 are aligned parallel to each other along the second axis 120 and spaced a distance 14 apart.

The distance 122 between the rows and the spacing between assemblies 32 in a common row provide an offset path for flow 30. Additionally, the offset orientation of the assemblies 32 between rows provides for flows to move through the array along both the first axis 118 and the second axis 120 rather than straight through along one or the other axes 118, 120.

Figure 11:
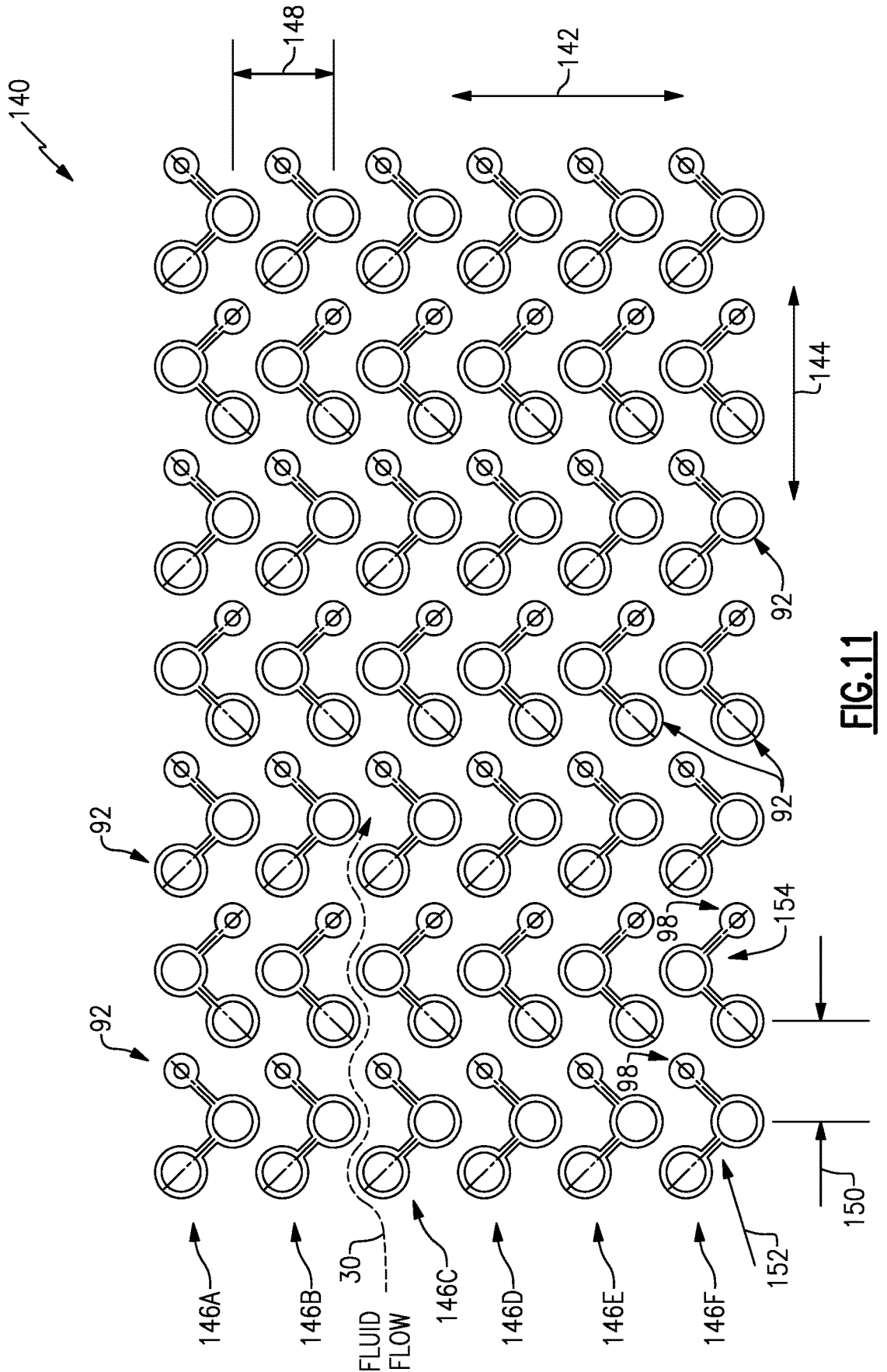
FIG. 11 is a schematic view of a portion of another example microtube array embodiment.

Referring to FIG. 11, another portion of an example microtube array 140 is shown that includes the microtube assembly 92 (FIG. 7). The microtube assemblies 92 are arranged in rows 146A-F. The orientation of each of the microtube assemblies 92 is alternated. In one example embodiment, the alternated orientation includes the third tube portion 98 set at a first orientation indicated at 152 and the third tube portion 98 set at a second orientation indicated at 154. The example alternating orientation provides for the third tube portion 98 of each microtube assembly 92 along one of the rows 146A-F to be facing in a different direction. In one disclosed example, the microtube portion 92 is flipped such that a direction that the V-shape is facing is alternated across each row 146A-F.

The alternating orientation of the microtube assemblies 92 extends across the array 140 along a second axis 144 corresponding to each row 146A-F. Each of the microtube assemblies 92 is spaced a distance 150 apart in a direction parallel to the second axis 144. The rows are spaced apart a distance 148 in a direction parallel with the first axis 142. The configuration, orientation and spacing of the rows 146A-F defines a non-linear path for flow 30 through the array 140. The non-linear path provides improvements heat transfer.

Although example microtube arrays 116 and 140 are shown and described by way of example, other array configurations utilizing any one or combination of the disclosed microtube arrays could be utilized and are within the contemplation and scope of this disclosure.

Accordingly, the disclosed microtube assemblies provide increased stiffness that improves vibratory responses to external vibratory inducing inputs.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A heat exchanger assembly comprising:
an inlet manifold configured to receive a first working fluid;
a plurality of microtube assemblies that define a corresponding plurality passages for receiving the first working fluid from the inlet manifold, wherein each of the plurality of microtube assemblies comprise a one-piece unitary structure having a first web portion extending between a first microtube portion, a second microtube portion, and a second web portion extending outward from one of the first microtube portion and the second microtube portion and a third microtube portion, wherein the third microtube portion includes a third inner diameter that is different than a first inner diameter of the first microtube portion and a second inner diameter of the second microtube portion; and
an outlet manifold configured to receive and exhaust the first working fluid from the plurality of passages.

2. The heat exchanger assembly as recited in claim 1, wherein the first microtube portion and the second microtube portion have at least one of:
a common inner diameter;
a common outer diameter; and
a common wall thickness.

3. The heat exchanger assembly as recited in claim 1, wherein the third microtube portion includes a third wall thickness that is greater than a wall thickness of either the first microtube portion and the second microtube portion.

4. The heat exchanger assembly as recited in claim 1, wherein the second web portion includes a second width transverse to a longitudinal length that is different than a first width of the first web portion.

5. The heat exchanger assembly as recited in claim 1, further comprising a fourth microtube portion, a third web portion extending between the fourth microtube portion and one of the first microtube portion, the second microtube portion and the third microtube portion and a fourth web portion.

6. A heat exchanger assembly comprising:
an inlet manifold configured to receive a first working fluid;

an outlet manifold spaced apart from the inlet manifold; and
a plurality of microtube assemblies that define corresponding plurality passages for the first working fluid between the inlet manifold and the outlet manifold,
wherein each of the plurality of microtube assemblies comprise a one-piece unitary structure having a first web portion extending between a first microtube portion and a second microtube portion, a third microtube portion and a second web portion extending between the third microtube portion and one of the first microtube portion and the second microtube portion, wherein the third microtube portion includes a third inner diameter that is different than a first inner diameter of the first microtube portion and a second inner diameter of the second microtube portion; and
the plurality of microtube assemblies are spaced apart from each other in a first direction transverse to a longitudinal length and a second direction transverse to the longitudinal length.

7. The heat exchanger assembly as recited in claim 6, wherein the plurality of microtube assemblies are arranged in at least two rows aligned in one of the first direction and the second direction and offset in the other of the first direction and the second direction.

8. The heat exchanger assembly as recited in claim 6, wherein an orientation of the plurality of microtube assemblies is alternated between a first orientation of the third microtube portion and a second orientation of the third microtube portion.

9. The heat exchanger assembly as recited in claim 8, wherein the third inner diameter of the third microtube portion is smaller than either of the first inner diameter and the second inner diameter.

10. The heat exchanger assembly as recited in claim 9, wherein the third microtube portion includes a third wall thickness of the third wall thickness is greater than a wall thickness for either of the first microtube portion and the second microtube portion.

11. A method of assembling a heat exchanger comprising the steps of:
forming a plurality of microtube assemblies as a one-piece unitary structure having a first web portion extending between a first microtube portion and a second microtube portion, and a second web portion extending between one of the first microtube portion and the second microtube portion and a third microtube portion, wherein forming the plurality of microtube assemblies comprises extruding the first web portion, the second web portion, the first microtube portion, the second microtube portion, and the third microtube portion without any formed seams or joints and the third microtube portion has a third inner diameter that is different than a first inner diameter of the first microtube portion and a second inner diameter of the second microtube portion;
attaching a first end of each of the plurality of microtube assemblies to an inlet manifold; and
attaching a second end of each of the plurality of microtube assembles to an outlet manifold.

12. The method as recited in claim 11, further comprising arranging the plurality of microtube assemblies in at least two rows aligned in one of first direction and a second direction and offset in the other of the first direction and the second direction.

* * * * *